United States Patent [19]

Mikita et al.

[11] Patent Number: 4,703,067

[45] Date of Patent: Oct. 27, 1987

[54] PROCESS FOR PREPARING DRY SOLID WATER ABSORBING POLYACRYLATE RESIN

[75] Inventors: Muneharu Mikita, Takatsuki; Shozo Tanioku, Nara; Takayasu Touda, Osaka, all of Japan

[73] Assignee: American Colloid Company, Arlington Heights, Ill.

[21] Appl. No.: 16,262

[22] Filed: Feb. 19, 1987

Related U.S. Application Data

[62] Division of Ser. No. 730,638, May 6, 1985, Pat. No. 4,654,393, which is a division of Ser. No. 436,428, Oct. 25, 1982, Pat. No. 4,552,938.

[30] Foreign Application Priority Data

Oct. 26, 1981 [JP] Japan ................................ 57-171559
Jul. 21, 1982 [JP] Japan ................................ 58-128266

[51] Int. Cl.⁴ ........................................... C08F 220/06
[52] U.S. Cl. .................................. 521/63; 427/385.5; 521/149
[58] Field of Search ............... 521/63, 99, 131, 149; 427/385.5

[56] References Cited

U.S. PATENT DOCUMENTS

| | | | |
|---|---|---|---|
| 2,956,046 | 10/1960 | Glavis | 526/240 |
| 4,071,650 | 1/1978 | Gross | 526/240 |
| 4,093,776 | 6/1978 | Aoki | 526/240 |
| 4,154,910 | 5/1979 | Tanaka | 521/63 |
| 4,167,464 | 9/1979 | George | 526/240 |
| 4,486,489 | 12/1984 | George | 526/240 |

*Primary Examiner*—Paul R. Michl
*Attorney, Agent, or Firm*—Mason, Kolehmainen, Rathburn & Wyss

[57] ABSTRACT

A process for preparing a solid, water absorbing, cross-linked polyacrylate resin including combining potassium acrylate and a polyvinyl monomer, such as N,N-methylene bisacrylamide, with water in an amount of 55 to 80 combined weight percent of potassium acrylate and polyvinyl monomer based on the total weight of potassium acrylate, polyvinyl monomer and water to form a monomer mixture, and adding a polymerization initiator to the monomer mixture to initiate polymerization of the monomer mixture. The monomer mixture then is polymerized without external heating by utilizing the exothermic heat of reaction as substantially the only non-ambient energy source to drive water away from said polyacrylate resin to form the cross-linked polyacrylate resin having a water content sufficiently low (i.e. 15% or less) to be powdered, such as by pulverization, without an intermediate drying step.

6 Claims, No Drawings

PROCESS FOR PREPARING DRY SOLID WATER ABSORBING POLYACRYLATE RESIN

CROSS REFERENCE TO RELATED APPLICATIONS

This application is a division of application Ser. No. 730,638 filed May 6, 1985, now U.S. Pat No. 4,654,393, whichis a division of then copending parent application Ser. No. 436,428 filed Oct. 25, 1982, now Pat. No. 4,552,938.

FIELD OF THE INVENTION

The present invention relates to a process for preparing water absorbing dry solid resins.

BACKGROUND OF THE INVENTION

Water absorbing resins have found wide use in sanitary goods, hygenic goods, water retaining agents, dehydrating agents, sludge coagulants, thickening agents and condensation preventing agents and are also useful as release control agents for various chemicals.

Water absorbing resins heretofore known include hydrolysis products of starch-acrylonitrile graft polymer, carboxymethylcellulose, cross-linked polyacrylate products and other resins such as polyvinyl alcohol, polyethylene oxide and polyacrylonitrile resins. Of these water absorbing resins, the hydrolysis products of starch and acrylonitrile graft polymers have comparatively high ability to absorb water but require a cumbersome process for production and have the drawback of low heat resistance and decaying or decomposing easily due to the presence of starch which is a natural polymeric material. Carboxymethylcellulose, polyethylene oxide and polyacrylonitrile resins still remain to be improved in water absorbing ability. Among the conventional water absorbing resins, polyacrylate cross-linked products appear promising in respect of both water absorbing ability and stability of quality.

As one of the processes for polymerizing polyacrylic acid or acrylates, an aqueous solution polymerization process is known. The polymer obtained by this process is soluble in water and must therefore be cross-linked by some method if it is desired to modify the polymer into a useful water absorbing resin. However, even if the modification is effected with use of a cross-linking agent concurrently with or after the polymerization by the above process, the resulting reaction product is in the form of a highly viscous aqueous solution or a gel containing absorbed water which is difficult to handle. Thus the product must be dehydrated (dried) for solidification to obtain a water absorbing resin in the desired form (powder). It is nevertheless difficult to dry the reaction product efficiently by the usual rotary drum roller method or spray drying method because excessive cross-linking frequently takes place due to overheating during drying or reduced cross-linking density conversely results from insufficient drying. Extreme difficulties are therefore encountered in preparing a product of desired water content and water absorbing ability stably.

SUMMARY OF THE INVENTION

The main object of the present invention is to provide a process for preparing a water absorbing (cross-linked) acrylate resin product of low water content by aqueous solution polymerization without necessitating any additional dehydrating or drying step.

The other objects and features of the invention will become apparent from the following description.

To fulfill the foregoing object, the present invention provides a process characterized in that a heated aqueous solution comprising potassium acrylate, a water-miscible to water-soluble polyvinyl monomer, water and, when desired, an organic solvent having a boiling point of 40° to 150° C., and having a combined monomer concentration of 55 to 80 wt. % is subjected to polymerization in the presence of a polymerization initiator without external heating while allowing water to evaporate off.

DETAILED DESCRIPTION OF THE INVENTION

We have conducted extensive research in order to obtain easily and rapidly a dry solid of water absorbing resin having a low water content and high water absorbing ability by preparing a cross-linked polyacrylate product by aqueous soluton polymerization while dehydrating or drying the reaction product with use of the heat evolved by the polymerization reaction (and cross-linking reaction) without necessitating external heating for the evaporation of water or any additional drying step. Consequently we have found that the evaporation of water by the heat of polymerization is greatly influenced by the kind of the monomer salt to be polymerized and also by the combined concentration of the monomer salt and the compound used as the cross-linking agent which are contained in the aqueous solution, such that when specific monomer salt is used in the form of an aqueous solution having a concentration adjusted within a specified range, the monomer salt can be polymerized and cross-linked very rapidly without external heating to achieve a desired degree of polymerization. We have further found that water can be evaporated rapidly from the reaction system by the heat of the polymerization reaction to readily give the desired dry solid having a lower water content and high water absorbing ability without resorting to any subsequent drying step. We have also found that when the aqueous solution further contains an organic solvent having a boiling point of 40° to 150° C., the temperature of the aqueous solution is controllable with great ease and the resulting cross-linked resin has remarkably improved ability to absorb water at an initial rate.

The present invention has been accomplished based on these novel findings.

When an aqueous solution not containing an organic solvent is to be used for the process of the invention, potassium acrylate and a water-miscible to water-soluble polyvinyl monomers are formulated into a hot aqueous solution which contains these monomers in a specified combined concentration. The solution is subjected to a polymerization reaction (and also to a cross-linking reaction). The polymerization reaction proceeds sufficiently within a very short period of time while permitting the heat of the polymerization reaction to evaporate water rapidly from the reaction system, whereby a dry solid of water absorbing resin having a low water content can be obtained directly as desired without necessitating any subsequent drying step. The solid can be easily pulverized into a powder which is suited to the desired use. Moreover, the process of the invention affords, with good stability at all times, a water absorbing resin solid having a very high quality without irregularities in the degree of polymerization which would result from overheating due to external heating or drying step and which would lead to impaired water absorbing ability. Further according to the process of the invention, the polymerization reaction and evaporation of water can be completed very rapidly usually within several minutes without external heating. Thus the process can be practiced very efficiently with greatly reduced consumption of heat energy. The process further achieves a high degree of polymerization and is well suited to a commercial operation.

When incorporating an organic solvent according to the invention, the aqueous monomer solution has a solidifying point which is about 10° to about 20° C. lower than otherwise. This increase the allowable range of temperature control at least about 3 times. The organic solvent used is vigorously evaporated along with water by the heat of polymerization of the monomer. Since the latent heat of the evaporation is considerably smaller than that of water, the organic solvent functions as a blowing agent in the polymerization reaction system, consequently rendering the resulting resin porous. The resin exhibits about 2 to about 5 times higher initial rate of water absorption than the one obtained without using the organic solvent while possessing high water absorbing ability.

Thus, the organic solvent, when added to the aqueous monomer solution, produces improved effects without in any way impairing the advantages resulting from the use of the monomer solution.

According to the process of the invention, a hot aqueous solution is prepared first which comprises potassium acrylate, a water-miscible to water-soluble polyvinyl monomer, water and, when desired, an organic solvent having a boiling point of 40° to 150° C., and which contains the acrylate monomer and the polyvinyl monomer in a combined concentration of 55 to 80 wt. %. The concentration of the monomers is deliberately determined considering the state of the solution (i.e. as to whether or not the monomers can be completely dissolved in water), ease of the reaction of the monomers, escape of the monomers due to the scattering during the reaction, etc. The aqueous solution can be prepared easily usually by placing acrylic acid, potassium hydroxide for neutralizing the acid and the polyvinyl monomer into water in such amounts that the resulting solution has the above-mentioned monomer concentration. To dissolve the monomers thoroughly, the mixture can be heated at an elevated temperature. According to the present invention, it is critical to use potassium hydroxide as the neutralizing agent. If ammonia or amine, for example, is used instead, it is difficult to obtain the desired dry solid of water absorbing resin. Even if a resin is then obtained, the yield is very low while the resin has low water absorbing ability. Further when an alkali metal compound other than potassium hydroxide, such as sodium hydroxide, lithium hydroxide, cesium hydroxide, potassium carbonate or sodium carbonate is used as the neutralizing agent, it is difficult to prepare an aqueous solution of high concentration as desired, consequently making it impossible to obtain a dry solid of polyacrylate cross-linked product of low water content as contemplated. Although it is desirable to use potassium hydroxide usually in an amount sufficient to neutralize acrylic acid 100 mole %, there is no particular need to neutralize the acid 100% insofar as the hydroxide is used in such an amount as to achieve not less than about 70% neutralization. Accordingly the aqueous solution may contain up to about 30% of free acrylic acid. However, a large quantity of free acrylic acid, if present in the aqueous solution, is likely to partly splash out of the system to result in a loss during the reaction, leading to a reduced degree of polymerization. Use of an excessive amount of the neutralizing agent will not raise any particular problem, but the excess does not participate in the polymerization reaction and is therefore useless.

The polyvinyl monomer to be used in the invention must be miscible with or soluble in water so that the monomer will be contained in the aqueous solution of the monomer mixtures as uniformly dissolved or dispersed therein. Examples of such polyvinyl monomers are usual cross-linking agents including bisacrylamides such as N,N-methylenebisacrylamide and N,N-methylenebismethacrylamide; polyacrylic (or polymethacrylic) acid esters represented by the following formula (I); and diacrylamides represented by the following formula (II). Among these, especially preferably are N,N-methylenebisacrylamide, N,N-methylenebismethacrylamide and like bisacrylamides. Formula (I)

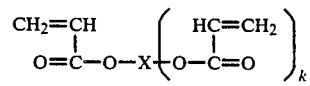

wherein X is ethylene, propylene, trimethylene, hexamethylene, 2-hydroxypropylene, $-(CH_2CH_2O-)_nCH_2CH_2-$ or

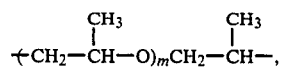

n and m each an integer of from 5 to 40, and k is 1 or 2.

The compounds of the formula (I) are prepared by reacting polyols, such as ethylene glycol, propylene glycol, trimethylolpropane, 1,6-hexanediol, glycerin, pentaerythritol, polyethylene glycol and polypropylene glycol, with acrylic acid or methacrylic acid. Formula (II):

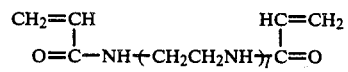

wherein l is 2 or 3.

The compounds of the formula (II) are obtained by reacting polyalkylenepolyamines, such as diethylenetriamine and triethylenetetramine, with acrylic acid.

The polyvinyl monomer is used in an amount of about 0.001 to 0.3 wt. %, preferably 0.005 to 0.1 wt. %, of the amount of potassium acrylate in the aqueous solution to be prepared, or of the combined amount of the acrylate and free acrylic acid, whereby the desired dry solid of polyacrylate cross-linked product can be obtained which has high water absorbing ability. If a large excess of the monomer is used, the resulting polymer will have exceedingly high strength when in the form of a gel on absorption of water and therefore exhibit impaired water absorbing ability, whereas if it is used in too small an amount, a polymer sol will be obtained which conversely has low gel strength to exhibit reduced water absorbing ability, hence objectionable.

According to the invention, it is critical that the aqueous solution contain potassium acrylate (and free acyrlic acid) and the polyvinyl compound in a combined concentration of 55 to 80 wt. %, preferably 65 to 75 wt. %. The contemplated object can be fulfilled only when the aqueous solution of such a concentration is used as heated. When the combined concentration of the monomers is less than 55 wt. %, it is impossible to obtain the desired dry solid of low water content. The polymer then obtained can not be made into a powder suited for use unless subsequently subjected to a cumbersome drying step which will render the product costly and degraded. It is difficult in practice to prepare a solution with a combined concentration of more than 80 wt % in view of the solubility of the monomers.

Examples of organic solvents to be used in the invention when desired and having a boiling point of 40° to 150° C. are methanol, ethanol, propanol and like alcohol solvents, acetone, methyl ethyl ketone and like ketone solvents, cyclohexane, n-hexane, n-heptane and like hydrocarbon solvents, benzene, toluene and like aromatic hydrocarbon solvents, and tetrahydrofuran and like furan solvents. These solvents may be used singly or in admixture. The solvent is used in an amount of 0.5 to 15 wt. %, preferably 1 to 10 wt. %, based on the combined amount of the monomers. With less than 0.5 wt. % of the solvent present, a sufficient blowing action will not take place, while the solidifying point of the monomer solution will not lower greatly. Conversely if more than 15 wt. % of the solvent is used, the resulting resin is likely to exhibit reduced water absorbing ability although achieving a high initial rate of water absorption. Moreover the monomers are likely to separate out, hence objectionable. Because the monome solution is heated prior to polymerization and further because the organic solvent evaporates along with water, the boiling point of the solvent is more preferably in the range of 55° to 120° C.

The aqueous solution of monomers containing the organic solvent admixed therewith (hereinafter refered to as "mixed solution") is heated and thereafter subjected to a polymerization reaction (and to cross-linking reaction) with addition of a polymerization initiator. Although the heating temperature is not particularly limited since the mixed solution is initiated into polymerization by the addition of the initiator, the temperature is usually about 50° to about 85° C., preferably about 60° to about 75° C. Various polymerization initiators are usable which are known for use in preparing polyacrylates. Examples of useful initiators are redox initiators comprising a reducing agent, such as a sulfite or bisulfite of an alkali metal, ammonium sulfite or ammonium bisulfite, and an initiator, such as a persulfate of an alkali metal or ammonium persulfate, in combination with the reducing agent; azo initiators including azobisisobutyronitrile, 4-t-butylazo-4'-cyanovaleric acid, 4,4'-azobis(4-cyanovaleric acid) and 2,2'-azobis(2-amidinopropane)-hydrochloric acid salt; etc. These initiators can be used singly or in a suitable combination. Of these, especially preferable are a redox initiator composed of ammonium persulfate and sodium hydrogensulfite, and azo initiators such a azobisisobutyronitrile and 2,2'-azobis(2-amidinopropane)-hydrochloric acid. These initiators are advantageously used usually in the form of an aqueous solution but can be used as diluted with a suitable solvent. The initiator is used in a usual amount, i.e. in an amount, calculated as solids, of about 0.1 to about 10%, preferably about 0.5 to about 5%, of the combined weight of the monomers, namely acrylate (and free acrylic acid) and polyvinyl monomer. Depending on the amount and kind of the initiator, the initiator is usable conjointly with isopropyl alcohol, alkylmercaptan or like usual chain transfer agent to control the molecular weight of the polyacrylate to be obtained.

By the addition of the polymerization initiator, the mixed solution is subjected to polymerization with evaporation of water without heating the system from outside. More advantageously the reaction is carried out by admixing a predetermined amount of the initiator or an aqueous solution thereof with the mixed solution and causing the resulting mixture to flow down onto and spread over a traveling belt. When the initiator is used in the form of an aqueous solution, care should be taken so that the combined monomer concentration of the mixture will not be lower than the aforementioned lower limit, i.e. 55 wt. %. The initiator can be applied also to the portion of the belt onto which the mixture is to be poured.

The polymerization proceeds rapidly after admixing the initiator with the mixed solution and is completed within a short period of time, usually in about 30 seconds to about 10 minutes. The reaction is exothermic, so that the reaction system is rapidly heated to about 100° to about 130° C. by the heat of polymerization. Consequently water evaporates from the system rapidly to give a polymer (dry solid) of desired low water content without resorting to any external heating. The water content of the polymer, although slightly different under different reaction conditions, is usually up to about 15%, preferably up to about 10%. Subsequently the dry solid polymer can be made into the desired powder easily by a usual method, for example, by pulverization without necessitating any drying step.

The powder thus obtained has outstanding water absorbing ability and is useful for sanitary goods, paper diaper, disposable duster and like hygenic goods, agricultural or horticultural water retaining agents, industrial dehydrating agents, sludge coagulants, thickening agents, condensation preventing agents for building materials, release control agents for chemicals and various other applications.

The present invention will be described in greater detail with reference to the following examples and comparison examples.

EXAMPLES 1

To 22.2 g of deionized water are added 72.1 g of acrylic acid first, then 49.5 g of potassium hydroxide having a purity of 85% and serving as a neutralizing agent, and thereafter 0.01 g of N,N-methylenebisacrylamide as a polyvinyl monomer to prepare an aqueous solution of potassium acrylate having a neutralization degree of 75% and a combined monomer concentration of 70 wt. %.

The aqueous solution is maintained at 70° C., and with the solution are admixed 2.9 g of 18% aqueous solution of ammonium persulfate (0.5 wt. % based on the combined weight of the potassium acrylate, free acrylic acid and N,N-methylenebisacrylamide, the same as hereinafter). The mixture is poured onto a traveling endless belt and spread thereover in the form of a layer about 10 mm in thickness. About 30 seconds thereafter, the mixture starts to polymerize, and the reaction is completed in about 1 minute. The maximum temperature of the mixture during the reaction is about 120° C.

The reaction gives a dry solid strip of cross-linked potassium polyacrylate product having a water content of 11% and a residual monomer concentration of 1200 ppm. The strip is made into a powder by a pulverizer. The powder has water absorbing abiltiy of 450 as measured with use of deionized water or 60 as measured with 1% saline. The water absorbing ability is determined by placing 1 g of the powder (as completely dried) into test water and measuring the weight (g) of water absorbed by the powder.

EXAMPLES 2 TO 9

Polymers are prepared in the same manner as in Example 1 with the exception of varying, as listed in Table 1, at least one of the combined concentration of monomers, the temperature at which the aqueous solution is maintained, the amount of polyvinyl monomer (N,N-methylenebisacrylamide), the kind and amount (degree of neutralization) of neutralizing agent, and the amounts, based on the combined amount of the monomers, of ammonium persulfate (APS) and sodium hydrogensulfite (SHS) serving as the polymerization initiator. Table 1 also shows the conditions involved in Example 1.

TABLE 1

| Example No. | Concn. of Monomers (wt. %) | Temp. (°C.) | Polyvinyl monomer (wt. %) | Concn. of (wt. %) APS | SHS | Neutralizing agent | Degree of neutralization |
|---|---|---|---|---|---|---|---|
| 1 | 70 | 70 | 0.01 | 0.5 | 0.5 | KOH | 75 |
| 2 | 60 | 70 | 0.01 | 0.5 | 0.5 | " | " |
| 3 | 70 | 75 | 0.01 | 0.5 | 0.5 | " | " |
| 4 | 70 | 70 | 0.03 | 0.5 | 0.5 | " | " |
| 5 | 70 | 70 | 0.05 | 0.5 | 0.5 | " | " |
| 6 | 70 | 70 | 0.10 | 0.5 | 0.5 | " | " |
| 7 | 70 | 70 | 0.01 | 0.8 | 0.8 | " | " |
| 8 | 70 | 70 | 0.01 | 1.0 | 1.0 | " | " |
| 9 | 70 | 70 | 0.01 | 0.5 | 0.5 | " | " |

The amount of polyvinyl monomer listed is expressed in % by weight based on the combined amount of potassium acrylate, free acrylic acid and polyvinyl monomer, and the concentration of initiator is expressed in % by weight based on the combined amount by weight (calculated as solids) of the monomers and the initiator, the same as hereinafter.

Table 2 below shows the water content of each dry solid of polymer (cross-linked potassium polyacrylate product) and the water absorbing ability of the powder prepared from the solid in the same manner as in Example 1. The water absorbing ability is determined in the same manner as in Example 1.

TABLE 2

| Example No. | Water Content (%) | Water absorbing ability Deionized Water | 1% Saline |
|---|---|---|---|
| 1 | 11 | 450 | 60 |
| 2 | 15 | 530 | 65 |
| 3 | 8 | 500 | 63 |
| 4 | 11 | 420 | 57 |
| 5 | 13 | 360 | 55 |
| 6 | 12 | 280 | 48 |
| 7 | 10 | 460 | 55 |
| 8 | 11 | 450 | 55 |
| 9 | 11 | 420 | 54 |

COMPARISON EXAMPLE 1

A polymer salt is prepared in the same manner as in Example 1 except that the combined concentration of monomers is 40 wt. %. The polymer salt has a water content of 42%, cannot be pulverized directly but requires subsequent drying before pulverization.

COMPARISON EXAMPLE 2

A polymer salt is prepared in the same manner as in Example 1 except that the combined monomer concentration is 50 wt. %. The product has a water content of 33%, cannot be pulverized directly but requires subsequent heating before pulverization.

COMPARISON EXAMPLE 3

Although it is attempted to prepare an aqueous solution of sodium acrylate having a combined monomer concentration of 50 wt. % (neutralization degree 100%) in the same manner as in Example 1 with the exception of using sodium hydroxide in place of potassium hydroxide, it is impossible to obtain a uniform solution due to the separation of some precipitate. The solution does not become uniform even when heated to 65° C. An aqueous solution is obtained when it is heated to at least 70° C.

After maintaining the solution at the same temperature, the same polymerization initiator as used in Example 1 is admixed with the solution. The same procedure as in Example 1 is thereafter repeated to obtain a polymer salt having a water content of 30%, but the product cannot be pulverized directly and must be dried by heating for pulverization.

COMPARISON EXAMPLES 4 AND 5

Polymers are prepared in the same manner as in Example 1 with the exception of using N,N-methylenebisacrylamide as the polyvinyl monomer in the altered amounts listed in Table 3, which also shows the water content and water absorbing ability of each of the polymers obtained.

TABLE 3

| | Amount of Polyvinyl Monomer | Water Content | Water Absorbing Ability Deionized Water | 1% Saline |
|---|---|---|---|---|
| Comp. Ex. 4 | 0.0005 | 13 | 200 | 30 |
| Comp. Ex. 5 | 0.35 | 12 | 120 | 15 |

On absorption of water, the polymer obtained in Comparison Example 4 becomes a sol unlike the polymer obtained by the invention which becomes a gel.

EXAMPLES 10 TO 13

Polymers are prepared in the same manner as in Example 1 with the exception of changing at least one of the amount of N,N-methylenebisacrylamide and the kind and amount of the polymerization initiator as listed in Table 4 below. Table 4 also shows the water content and water absorbing ability of each polymer obtained.

TABLE 4

| Ex. No. | Initiator Kind | Concn. | Amt. of Polyvinyl Monomer | Water Content | Water Absorbing Ability Deionized Water | 1% Saline |
|---|---|---|---|---|---|---|
| 10 | 2,2'-azobis-(2-amidino-propane) hydrochloric acid | 0.5 | 0.01 | 11 | 520 | 58 |
| 11 | (2,2'-azobis-(2-amidino- | 0.5 | 0.02 | 12 | 610 | 65 |

TABLE 4-continued

| Ex. No. | Initiator Kind | Concn. | Amt. of Polyvinyl Monomer | Water Content | Water Absorbing Ability Deionized Water | 1% Saline |
|---|---|---|---|---|---|---|
| | propane) hydrochloric acid | | | | | |
| 12 | 2,2'-azobis-(2-amidinopropane) hydrochloric acid | 1.0 | 0.01 | 10 | 550 | 62 |
| 13 | 2,2'-azobis-(2,amidinopropane) hydrochloric acid | 1.0 | 0.02 | 11 | 580 | 63 |

EXAMPLES 14 TO 21

Polymers are prepared in the same manner as in Example 1 except that the compounds listed in Table 5 below are used as polyvinyl monomers in the listed amounts. Table 5 also shows the water content and water absorbing ability of each polymer obtained.

TABLE 5

| Ex. No. | Polyvinyl Monomer Kind | Amount | Water Content | Deionized Water Absorbing Ability |
|---|---|---|---|---|
| 14 | Ethylene glycol diallyl ester | 0.01 | 12 | 480 |
| 15 | Ethylene glycol diallyl ester | 0.02 | 13 | 430 |
| 16 | Diethylenetriamine-diacrylamide | 0.01 | 12 | 510 |
| 17 | Diethylenetriamine-diacrylamide | 0.02 | 12 | 450 |
| 18 | N,N—methylene-bismethacrylamide | 0.01 | 9 | 520 |
| 19 | N,N—methylene-bismethacrylamide | 0.05 | 11 | 390 |
| 20 | Polyethylene glycol diacrylate* | 0.01 | 10 | 500 |
| 21 | Polyethylene glycol diacrylate* | 0.05 | 11 | 430 |

*Polyethylene glycol diacrylate used in Examples 20 and 21 is represented by the following formula:

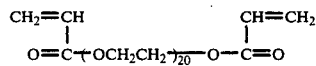

EXAMPLES 22 TO 25

Acrylic acid (72.1 g), 18.0 g of deionized water, 40.9 g of solid potassium hydroxide (water content 4%) and 5.2 g of one of the solvents (5 wt. % based on the monomers) listed in Table 6 are mixed together, and the mixture is maintained at 75° C. With the mixture is further admixed 4.0 g of 10% aqueous solution of 2,2'-azobis(2-amidinopropane)hydrocholoric acid salt. The resulting mixture is immediately poured onto a traveling endless belt and spread thereover to a thickness of 5 mm. About 15 seconds later, the mixture starts to polymerize, and the polymerization is completed in about 30 seconds. The maximum temperature of the mixture during the reaction is 130° to 135° C.

The reaction gives a dry strip of crosslinked potassium polyacrylate product, which is pulverized to a powder 20 to 100 mesh in particle size.

The same procedure as above is repeated with use of the other solvents. All the powders obtained have a water content of 4 to 6%.

A 0.1 g quantity of each of the powders is accurately measured out and the water absorbing ability of the powder is measured after immersing the powder in deionized water or 1% saline for 10 seconds, 30 seconds or 15 minutes. Table 6 shows the results.

EXAMPLE 26

An aqueous monomer solution is prepared in the same manner as in examples 22 to 25 with the exception of not using any organic solvent and using 23.2 g of deionized water. The solution is thereafter subjected to polymerization in the same manner as in these examples to obtain a powder of dry solid. Table 6 also shows the test results obtained with this powder.

TABLE 6

| Example No. Organic Solvent | 22 Acetone | 23 Ethanol | 24 Benzene | 25 Tetrahydrofuran | 26 (Water only) |
|---|---|---|---|---|---|
| Water absorbing ability (times) 1% Saline | | | | | |
| 10 Sec. | 73 | 68 | 70 | 76 | 54 |
| 30 Sec. | 83 | 82 | 85 | 85 | 75 |
| 15 Min. | 97 | 93 | 94 | 96 | 96 |
| Deionized water | | | | | |
| 10 Sec. | 620 | 690 | 600 | 690 | 300 |
| 30 Sec. | 900 | 910 | 880 | 920 | 750 |
| 15 Min. | 960 | 980 | 900 | 980 | 920 |

EXAMPLES 27 TO 29

Water absorbing resin solids are prepared in the same manner as in Example 22 with the exception of using 3, 5 or 10 wt. %, based on the monomers, of methanol in place of 5.2 g of acetone and varying the amount of deionized water so that the combined amount of the water and the methanol is 23.2 g. Each of the solids is tested for water content and also for water absorbing ability by immersion in 1% saline and deionized water for specified periods of time. The results are given in Table 7, which also shows the results of similar tests conducted with use of the solid of Example 26.

TABLE 7

| Example No. | 27 | 28 | 29 | 26 |
|---|---|---|---|---|
| Amount of organic solvent (based on monomers, %) | 3 | 5 | 10 | 0 |
| Water content of resin | 7.2 | 6.0 | 2.1 | 10.2 |
| Water absorbing ability (times) 1% Saline | | | | |
| 5 Sec. | 50 | 58 | 65 | 32 |
| 10 Sec. | 64 | 71 | 75 | 54 |
| 15 Sec. | 71 | 77 | 79 | 61 |
| 20 Sec. | 75 | 80 | 82 | 67 |
| 40 Sec. | 85 | 87 | 88 | 80 |
| 60 Sec. | 90 | 90 | 91 | 88 |
| 15 Min. | 97 | 93 | 94 | 96 |
| Deionized water | | | | |
| 5 Sec. | 250 | 420 | 570 | 140 |

TABLE 7-continued

| Example No. | 27 | 28 | 29 | 26 |
|---|---|---|---|---|
| 10 Sec. | 420 | 650 | 760 | 300 |
| 15 Sec. | 590 | 740 | 830 | 410 |
| 20 Sec. | 660 | 790 | 850 | 560 |
| 40 Sec. | 880 | 900 | 890 | 850 |
| 60 Sec. | 920 | 910 | 890 | 900 |
| 15 Min. | 930 | 910 | 890 | 920 |

What is claimed is:

1. A process for preparing a solid, water absorbing, cross-linked resin comprising:

combining a monomer mixture of (A) potassium acrylate; and (B) a water miscible or water soluble polyvinyl monomer, with water in an amount of 55 to 80 combined weight percent of (A) plus (B) based on the total weight of (A) plus (B) plus water to form a monomer mixture wherein the monomers of the monomer mixture consist essentially of (A) and (B);

adding a polymerization initiator to said monomer mixture capable of initiating, and in an amount sufficient to initiate polymerization of said monomer mixture;

depositing said monomer mixture including said initiator onto a support surface in sheet form for polymerization and cross-linking; and polymerizing said monomer mixture while utilizing the exothermic heat of reaction as substantially the only non-ambient energy source to drive water away from said polyacrylate resin to form said cross-linked polyacrylate resin having a water content sufficiently low to be powdered without an intermediate drying step.

2. The process of claim 1 wherein said sheet is deposited in a thickness of about 10 mm.

3. A process for preparing a solid, water absorbing, cross-linked resin comprising:

combining a monomer mixture of (A) potassium acrylate; and (B) a water miscible or water soluble polyvinyl monomer, with water in an amount of 55 to 80 combined weight percent of (A) plus (B) based on the total weight of (A) plus (B) plus water to form a monomer mixture wherein the monomers of the monomer mixture consist essentially of (A) and (B);

adding a polymerization initiator to said monomer mixture capable of initiating, and in an amount sufficient to initiate polymerization of said monomer mixture;

adding a non-aqueous solvent having a boiling point of 40°–150° C. with said monomers (A) and (B); and polymerizing said monomer mixture while utilizing the exothermic heat of reaction as substantially the only non-ambient energy source to drive water away from said polyacrylate resin to form said cross-linked, porous polyacrylate resin having a water content sufficiently low to be powdered without an intermediate drying step.

4. The process of claim 3 wherein said solvent is a blowing agent.

5. The process of claim 3 wherein said solvent is an organic solvent.

6. The process of claim 3 wherein said non-aqueous solvent has a boiling point of 55° to 120° C.

* * * * *